United States Patent [19]

Anderson et al.

[11] 4,417,383
[45] Nov. 29, 1983

[54] METHOD OF ASSEMBLING PIPE JOINT

[75] Inventors: David L. Anderson, Muskegon; A. David Joseph, North Muskegon, both of Mich.

[73] Assignee: Sealed Power Corporation, Muskegon, Mich.

[21] Appl. No.: 360,245

[22] Filed: Mar. 22, 1982

Related U.S. Application Data

[60] Division of Ser. No. 132,875, Mar. 24, 1980, Pat. No. 4,351,550, which is a division of Ser. No. 52,667, Jun. 27, 1979, Pat. No. 4,224,161, which is a continuation-in-part of Ser. No. 906,256, May 15, 1978, abandoned.

[51] Int. Cl.³ ...................... B21D 39/00; B23P 11/00
[52] U.S. Cl. ...................................... 29/511; 29/525; 29/156.4 R
[58] Field of Search ............... 29/511, 525, 156.4 R; 285/382, 238, 256, 242, 259; 210/232, 460, 416 L

[56] References Cited

U.S. PATENT DOCUMENTS

| 868,524 | 10/1907 | Bayer | 285/382 |
|---|---|---|---|
| 1,291,388 | 1/1919 | Bright et al. | 285/382 X |
| 2,377,378 | 6/1945 | Saslaw | 285/238 |
| 2,866,581 | 12/1958 | Henchert | 29/511 X |
| 2,908,512 | 10/1959 | Morrow | 29/511 UX |
| 3,388,211 | 6/1968 | Nichols | 29/511 X |
| 3,421,467 | 1/1969 | Himelsbaugh | 29/511 |
| 4,103,937 | 8/1978 | Wakefield | 285/382 X |
| 4,117,261 | 9/1978 | Blevins et al. | 29/511 X |
| 4,129,503 | 12/1978 | Joseph | 210/460 X |
| 4,214,781 | 7/1980 | Joseph | 29/511 X |

FOREIGN PATENT DOCUMENTS

| 71735 | 2/1953 | Netherlands | 29/511 |
|---|---|---|---|
| 992040 | 5/1965 | United Kingdom | 29/511 |

*Primary Examiner*—Charlie T. Moon
*Attorney, Agent, or Firm*—Barnes, Kisselle, Raisch, Choate, Whittemore & Hulbert

[57] ABSTRACT

In an oil pump inlet screen assembly adapted to be immersed in an oil sump and comprising a filter screen including a housing and a lift pipe adapted to be inserted at one end into an oil pump opening, the improvement wherein the housing and lift pipe are molded integrally of plastic material, and wherein the screen assembly further comprises a metal eyelet received over the pipe end and adapted to be press-fitted into the pump opening. The eyelet includes coaxial cylindrical portions respectively disposed internally and externally of the pipe end and an external flanged end portion which captures a circumferential rib on the outside of the pipe both to retain the eyelet on the pipe end and to function as a stop to limit press-fit insertion of the pipe end into the pump opening.

5 Claims, 7 Drawing Figures

METHOD OF ASSEMBLING PIPE JOINT

This is a division of application Ser. No. 132,875, filed Mar. 24, 1980, now U.S. Pat. No. 4,351,550, issued Sept. 28, 1982 which is a division of Ser. No. 052,667 filed June 27, 1979, U.S. Pat. No. 4,224,161, issued Sept. 23, 1980, which was a continuation-in-part of Ser. No. 906,256 filed May 15, 1978, abandoned.

The present invention relates to metal-to-plastic pipe or tube joints, and to methods for manufacture thereof. More particularly, the invention relates to joints between the lift pipe of an oil pump inlet screen assembly and the pump housing for an internal combustion engine or the like.

An object of the present invention is to provide an economical and reliable metal-to-plastic pipe joint, and a method of manufacture thereof. A more specific object of the invention is to provide a joint between a plastic pipe and a metal housing adapted for use in connection with an oil pump and an inlet screen assembly which is able to withstand the high temperature and vibration conditions of an internal combustion engine oil circulation system. A particular object of the invention is to provide a metal-to-plastic pipe joint for use in the described environment which prevents plastic shrinkage and/or creep in the zone of the pipe joint and consequent loss of sealing engagement between the joint members.

Presently preferred embodiments of the invention are illustrated in the accompanying drawings which may be briefly described as follows.

Figure 1:
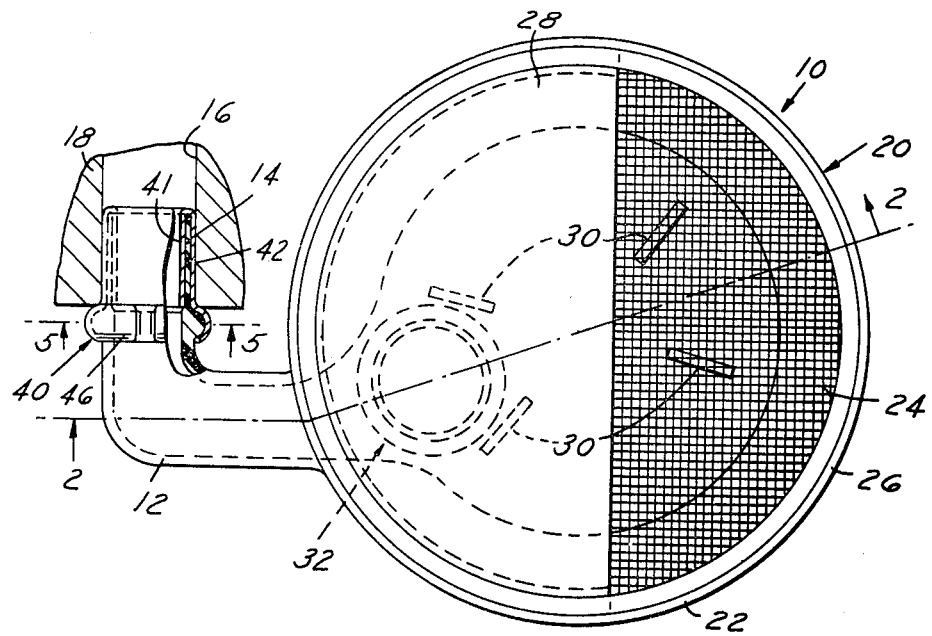
FIG. 1 is a plan view, partially in section, of an oil pump inlet screen assembly in accordance with the invention.

Referring to FIG. 1, an oil pump inlet screen assembly 10 in accordance with the invention comprises a conduit or lift pipe 12 having one end 14 adapted for fluid communication with a generally cylindrical opening 16 of a pump housing 18, and a filter screen generally indicated at 20 connected to the remote pipe end such that screen 20 may be suspended by pipe 12 from pump housing 18 and immersed in an oil sump (not shown). Screen 20 includes a dished housing 22 best seen in FIG. 2 having a galvanized wire mesh 24 ultrasonically staked or welded around the open housing edge 26. A metal or plastic baffle 28 is additionally affixed to edge 26 around a semicircular portion thereof. Mesh 24 is supported by bosses 30 against the pressure of oil flowing through the filter screen assembly in the direction indicated by the arrows in FIG. 2.

A pressure-release flapper or leaf valve generally indicated at 32 is disposed in mesh 24 to provide unfiltered oil to pump 18 (FIG. 1) should mesh 24 become clogged. Valve 32 comprises a collar 34 crimped around an opening in mesh 24 and capturing a leaf valve element 36 therein. Valves of the type illustrated at 32 are generally well known in the art and need not be described further.

In accordance with an important aspect of the present invention, housing 22 and lift pipe 12 are molded integrally of plastic material. Thermoplastic material, specifically glass-reinforced nylon (polyamide), is preferred. Glass reinforced polyphenol sulfide also is contemplated. Thermoplastic materials of this type are desirable for toughness and wear resistance, but are also generally characterized by poor dimensional stability due to material characteristics which react adversely under the elevated temperature and vibration conditions of an internal combustion engine. For example, both polyamide and polyphenol sulfide are characterized by a tendency to cold flow under such conditions. Polyamide also tends to be hygroscopic, although this is not considered to be a problem with polyphenol sulfide. Thus, it has been found that, if the pipe end 14 were merely press-fitted into pump opening 16 without additional reinforcement, the material at the pipe end would tend to creep and deform under the high temperature and vibration conditions of an internal combustion engine oil system, with consequent loss of sealing engagement between the pipe end and pump opening.

Figure 2:
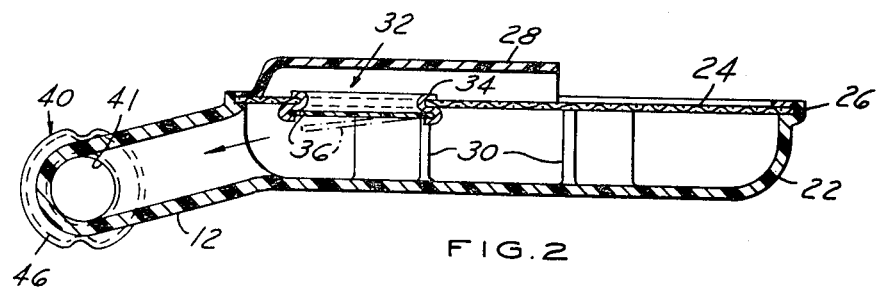
FIG. 2 is a sectional view taken along the line 2—2 in FIG. 1.
Figure 3:
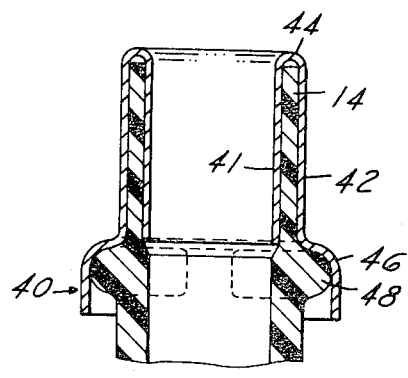
FIGS. 3, 4 and 5 are enlarged views of a portion of the pipe joint illustrated in FIG. 1 at successive stages of assembly.
Figure 4:
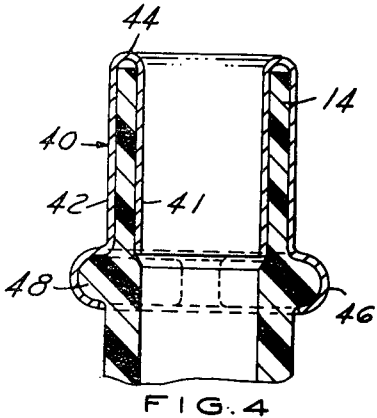
Figure 5:
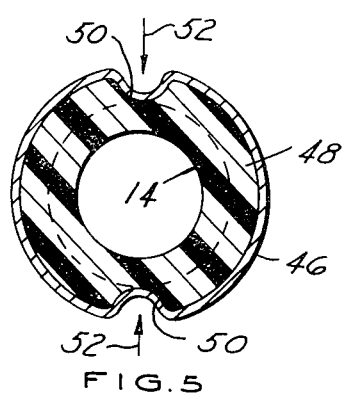

To overcome this difficulty, and in accordance with a second important aspect of the present invention, a metal eyelet 40 is received over pipe end 14 and adapts the pipe end for reliable press-fit sealing engagement with pump opening 16. Eyelet 40 preferably comprises coaxial cylindrical portions 41,42 connected at one end by a bridging portion 44 and respectively disposed internally and externally of pipe end 14, the outer surface of cylindrical eyelet portion 42 being in press-fit sealing engagement with pump opening 16 in the fully assembled stage of FIG. 1. A flanged skirt portion 46 extends outwardly and downwardly of external cylindrical portion 42, and is adapted to capture a circumferential rib 48 extending around the outer surface of pipe end 14 to fasten the eyelet firmly on the pipe end. As best seen in FIGS. 1, 3 and 4, inner and outer cylindrical portions are preferably of substantially the same axial length, this feature lending additional strength and stability to the pipe joint in assembly. Rib 48 is divided by diametrically opposed axial channels 50 into which skirt 46 is deformed, as best seen in FIGS. 2 and 5. This particular feature permits eyelet 40 to withstand up to four foot-pounds of torque without rotating with respect to pipe end 14 both after assembly and after a number of hours of actual operation.

In assembly, eyelet 40 is first loosely received over pipe end 14 such that skirt portion 46 rests against and drapes over rib 48 as illustrated in FIG. 3. The flanged skirt portion is then rolled or crimped over rib 48 as illustrated in FIG. 4 such that the rib is in a state of slight residual compression. Skirt 46 is then struck from the directions indicated at 52 in FIG. 5 to deform the skirt into the rib channels 50 A firm air-tight seal is thereby established between eyelet 40, specifically flanged skirt portion 46, and pipe end 14, specifically rib 48. Rib 48 is axially spaced from the pipe opening such that the rolled eyelet skirt 46 and the rib 48 cooperate to form a limit or stop for press-fit insertion of the pipe end into the pump opening as illustrated in FIG. 1. The metal-to-metal seal between eyelet 40 and the opposing surface of pump opening 16 is, of course, very reliable over the normally expected operating temperature range of an engine oil system. Additionally, the state of residual compression between eyelet skirt 46 and pipe rib 48 resists deformation and creep of the plastic pipe material in the area surrounding the pipe rib, such that a firm and reliable seal is maintained between the pipe and eyelet.

Figure 6:
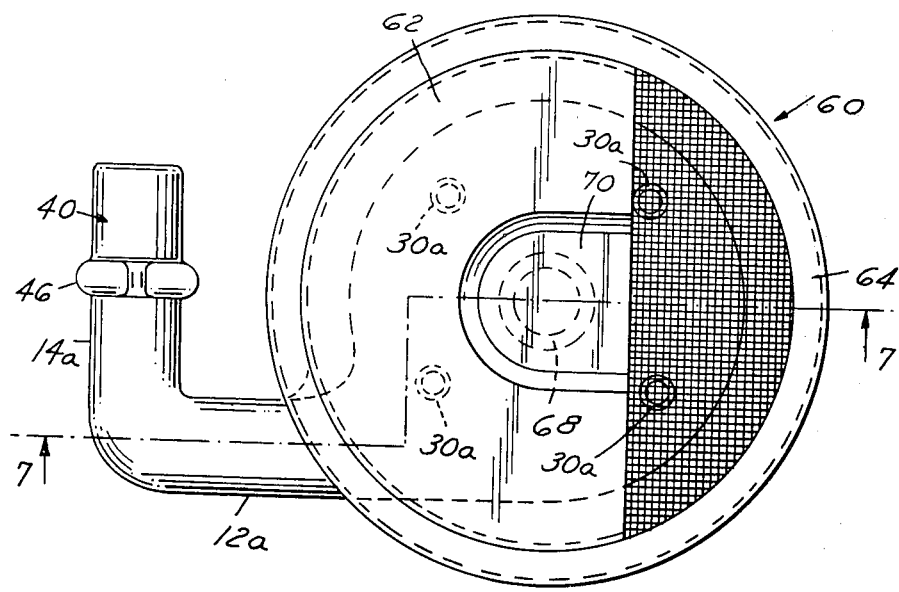
FIG. 6 is a plan view of an alternative embodiment of the screen assembly in accordance with the invention.
Figure 7:
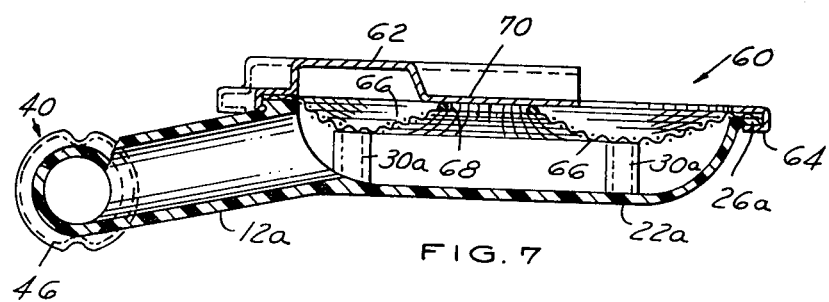
FIG. 7 is a sectional view taken along the line 7—7 in FIG. 6.

An alternative embodiment 60 of the invention is illustrated in FIGS. 6 and 7. A metal baffle 62 has a circular edge 64 crimped over a support shoulder 26a extending around dished housing 22a. A wire mesh screen 66 is captured between baffle edge 64 and shoulder 26a, and is resiliently forced against support bosses 30a such that an eyelet 68 located centrally of screen 66 is spring-biased into engagement with a depressed portion 70 of baffle 62. If screen 66 becomes clogged in operation, the resulting pressure on the screen overcomes the resilient force on eyelet 68 so that the eyelet moves away from baffle 62 and permits passage of unfiltered oil therethrough. The remaining structure of screen assembly 60, particularly with respect to eyelet 40, is identical or substantially identical to that hereinbefore described.

The invention claimed is:

1. A method of forming an air tight metal-to-plastic pipe joint for use in an oil filtering system which includes a metal pump housing having an opening, and an inlet screen assembly having a plastic pipe adapted at one end to communicate with said opening, said method comprising the steps of (a) providing a metal eyelet having inner and outer cylindrical portions connected at one eyelet end with said outer portion having a flanged portion remote from said one eyelet end, (b) placing said eyelet over said one pipe end, and (c) forming said flanged portion of said eyelet over a rib on said pipe such that said rib acts to retain said eyelet on said pipe end.

2. The method set forth in claim 1 further comprising the step of (d) deforming said flanged portion of said eyelet into at least one depression in said rib.

3. The method set forth in claim 1 comprising the additional step of press-fitting said eyelet and pipe end into a said pump opening.

4. The method set forth in claim 3 wherein said eyelet and pipe end are press-fitted into said opening up to said flanged portion such that said flanged portion and rib form a limit for said press-fit insertion.

5. The method set forth in claim 1 wherein said screen assembly includes a screen housing, and wherein said method includes the additional step of integrally molding said pipe and housing of thermoplastic material such as nylon or polyphenol sulfide.

* * * * *